L. J. BERG.
TRAP DOOR OPERATING MECHANISM.
APPLICATION FILED DEC. 17, 1907.
899,443.
Patented Sept. 22, 1908.
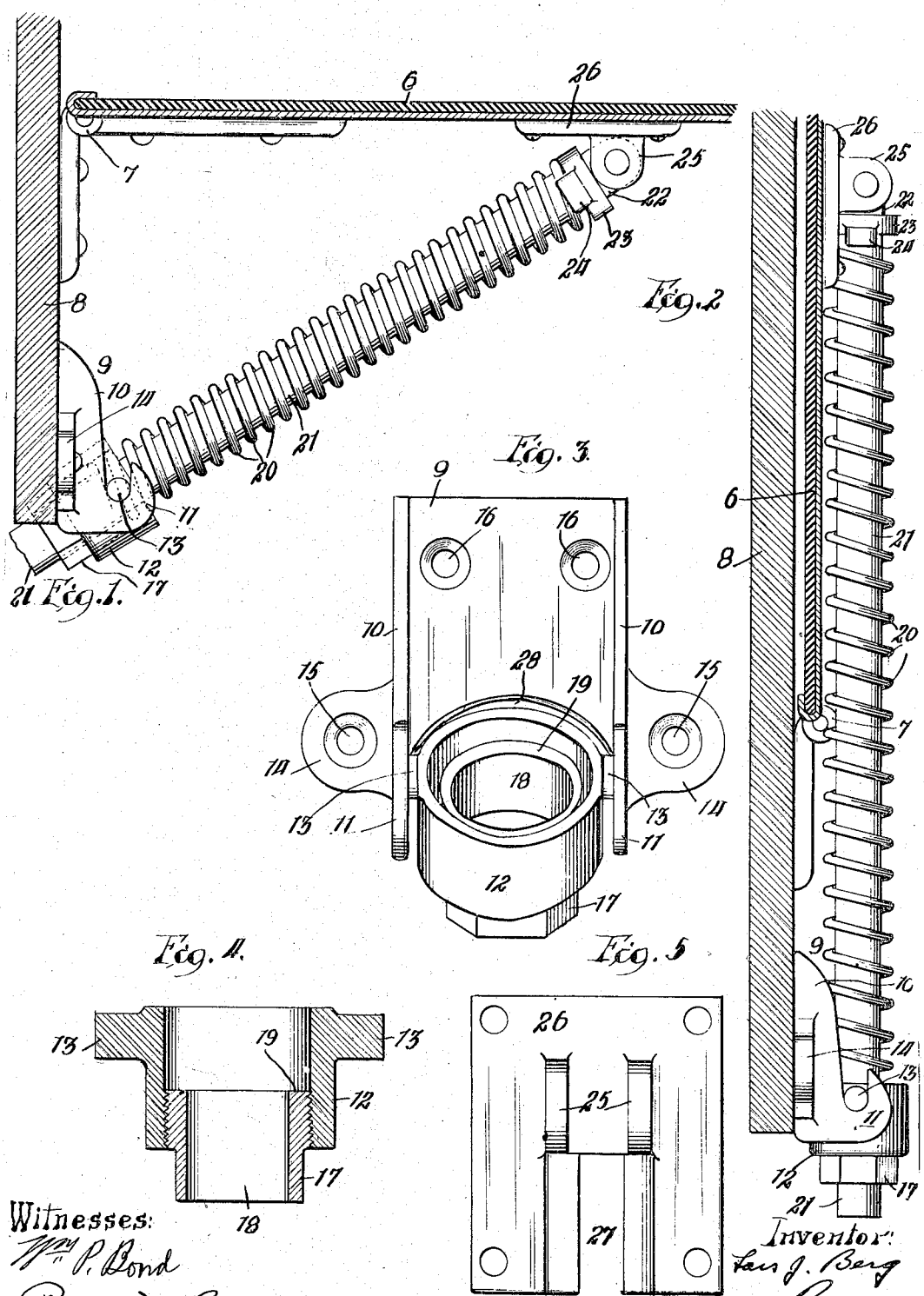

UNITED STATES PATENT OFFICE.

LARS J. BERG, OF CHICAGO, ILLINOIS, ASSIGNOR TO METALLIC SHEATHING COMPANY, A CORPORATION OF ILLINOIS.

TRAP-DOOR-OPERATING MECHANISM.

No. 899,443.            Specification of Letters Patent.           Patented Sept. 22, 1908.

Application filed December 17, 1907. Serial No. 406,872.

*To all whom it may concern:*

Be it known that I, LARS J. BERG, a citizen of the United States residing at Chicago, in the county of Cook and State of Illinois, have invented certain new and useful Improvements in Trap-Door-Operating Mechanism of which the following is a specification.

The mechanism of the present invention is intended primarily for use in connection with trap doors for vestibule cars, although the same mechanism may be applied for use in connection with trap doors generally.

The object of the present invention is to provide an easily attachable mechanism for automatically throwing up the trap door from a horizontal to a vertical position upon the release of the door; and the invention consists in the features of construction and combination of parts hereinafter described and claimed.

In the drawings illustrating the invention, Figure 1 is a sectional elevation, showing the door lowered; Fig. 2 a similar view, showing the door raised; Fig. 3 a front elevation of the fixed spring bracket; Fig. 4 a cross sectional view of the pivoted spring collar; and Fig. 5 a plan view of the door plate to which the spring rod is pivoted.

Referring to Fig. 1, 6 illustrates the trap door, which may be of any usual and well known formation, which door is pivoted, by means of a hinge 7, to the end wall 8 of the car or other suitable structure. The end wall 8 has secured thereto, below the level of the door, a bracket plate 9, which bracket plate is provided with outwardly extending side walls 10, which, at their lower ends, are extended to provide hooks 11, which hooks serve to pivot a collar 12 provided with laterally extending trunnions 13, which are held within the hooks, the collar as a whole being positioned to swing between the side walls of the plate, from the diagonal position shown in Fig. 1, to the vertical position shown in Fig. 2. The plate is further provided with laterally extending ears 14, provided with screw holes 15, which holes are supplemented by screw holes 16 in the upper portion of the plate, which screw holes provide for the attachment of the plate to the wall of the car or other suitable structure.

The collar 12 has screw-threaded into its lower portion a nut 17, provided with a smooth bore 18, which nut is of less interior diameter than the collar and serves to provide a shoulder or ledge 19, which receives the end of a coil spring 20, which is shown contracted in Fig. 1 and expanded in Fig. 2. The spring surrounds a smooth rod 21, which is slidably entered through the bore 18 of the nut 17, and is provided at its upper end with a tongue 22, which tongue is provided with a flange 23 against which the upper end of the spring abuts. The flange 23 has outwardly extending therefrom a pair of lugs 24, which embrace the upper end coil of the spring, the lower end of which is entered into the open end of the collar 12 and abuts against the ledge 19. The tongue 22 is pivoted between ears 25, which depend from a door plate 26, which door plate is provided with a recess 27 extending inwardly from the ears 25, which recess is of sufficient depth to receive the upper edge of the flange 23 when the latter is turned into the vertical position shown in Fig. 2. In like manner the plate 9 is cut away to provide a recess 28 in its lower portion intermediate the said walls, which recess provides a clearance for the collar 12 and spring rod 21 when the latter are drawn into the position shown in Fig. 1.

In use, when the trap door is thrown down into horizontal or closed position, the rod 21 will be moved downwardly and rearwardly and the spring compressed. When the door is released the spring will cause the door to rise up to the position shown in Fig. 2, which movement of the door retracts the rod, which latter slides through the bore of the nut 17, the collar meanwhile turning on its trunnions to accommodate the movement of the rod. If it is desirable to regulate the tension of the spring, such regulation can be effected by adjusting the nut 17, which can be screwed back or forth until the right adjustment is obtained. The tension of the spring being constantly against the ledge 19, holds the collar against displacement from the hooks 11, so that further means of attachment is unnecessary, and this renders the application of the spring mechanism, heretofore described, to a trap door extremely easy, which is a matter of importance in equipping cars of the type already in use.

What I regard as new and desire to secure by Letters Patent is:

1. In combination with a trap door hinged to an adjoining structure, a rod pivoted to the door, a bracket plate secured to the structure and provided with hooks, a collar provided with trunnions pivoted within the hooks, through which collar the rod is entered, and a coil spring encircling the rod intermediate the collar and the door, substantially as described.

2. In combination with a trap door hinged to an adjoining structure, a rod pivoted to the door and mounted to extend diagonally from the door toward the adjoining structure when the door is in closed position, and adapted to extend in substantially parallel relation with both the door and the structure when the door is open, a bracket secured to the structure and provided with hooks, a collar provided with trunnions pivoted within the hooks and having a bore through which the rod is slidably entered, and adapted to move with the rod from a position in diagonal relation with the door when closed, to a position in substantially parallel relation with the door when open, and a coil spring encircling the rod intermediate the collar and the door, substantially as described.

3. In combination with a trap door hinged to an adjoining structure, a rod pivoted to the door, a bracket secured to the structure, a collar pivoted within the bracket, through which collar the rod is entered, a coil spring encircling the rod intermediate the collar and the door, and an adjustable nut within the collar against which the coil spring bears, substantially as described.

4. In combination with a trap door hinged to an adjacent structure, a rod pivoted at one end of the door, a bracket plate secured to the structure and provided with hooks, a collar provided with trunnions pivoted within the hooks, a nut screwed into the collar and provided with a smooth bore through which the rod is entered, and a coil spring encircling the rod and bearing against the nut within the collar, substantially as described.

5. In combination with a trap door hinged to an adjacent structure, a plate secured to the door and provided with ears, a rod provided with a tongue pivoted between the ears, and further provided with a flange adjacent to the tongue, a plate secured to the adjacent structure and provided with inwardly extending hooks, a collar provided with trunnions journaled within the hooks, a nut screwed into the collar and provided with a smooth bore through which the rod is slidably entered, and a coil spring encircling the rod and bearing at one end against the inner edge of the nut within the collar and adapted to be adjusted by movements of the nut, substantially as described.

LARS J. BERG.

Witnesses:
WALKER BANNING,
PIERSON W. BANNING.